May 31, 1932.    G. W. CRABTREE    1,860,658
VEHICLE SPRING
Filed Dec. 21, 1929    3 Sheets-Sheet 1
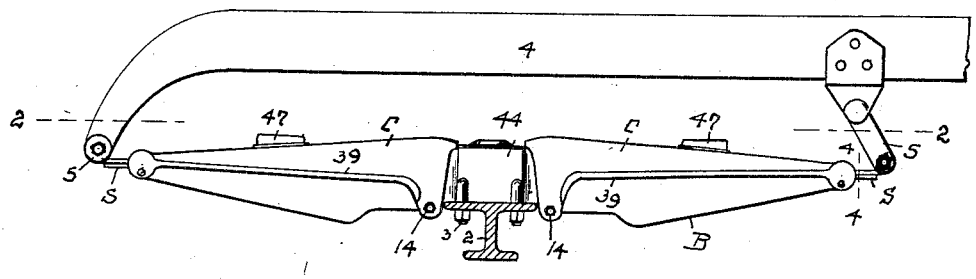
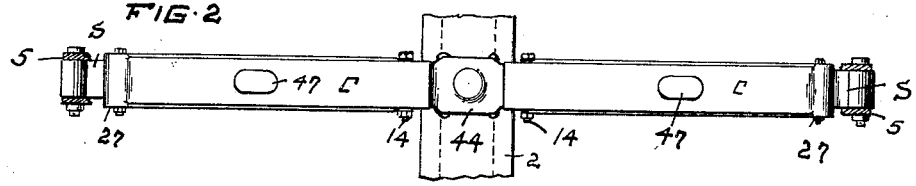
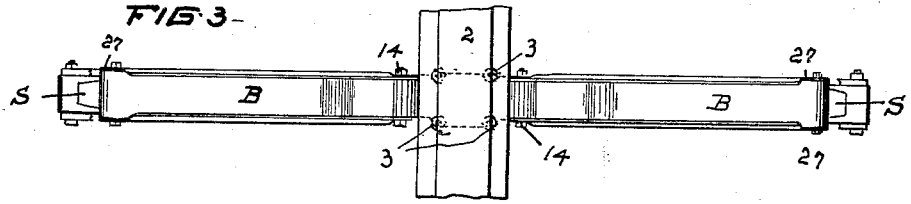
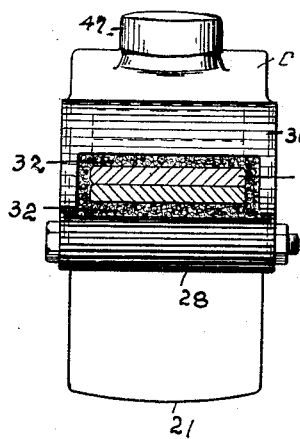 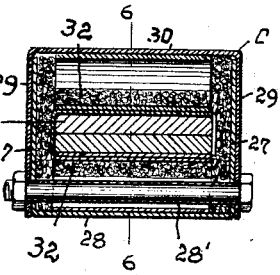 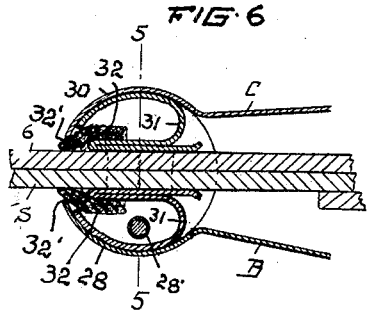
INVENTOR
GEORGE W. CRABTREE
BY Fisher, Moser + Moore
ATTORNEY May 31, 1932.  G. W. CRABTREE  1,860,658
VEHICLE SPRING
Filed Dec. 21, 1929   3 Sheets-Sheet 2
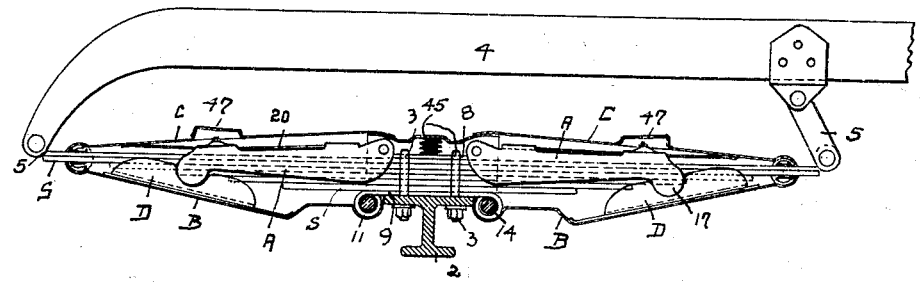
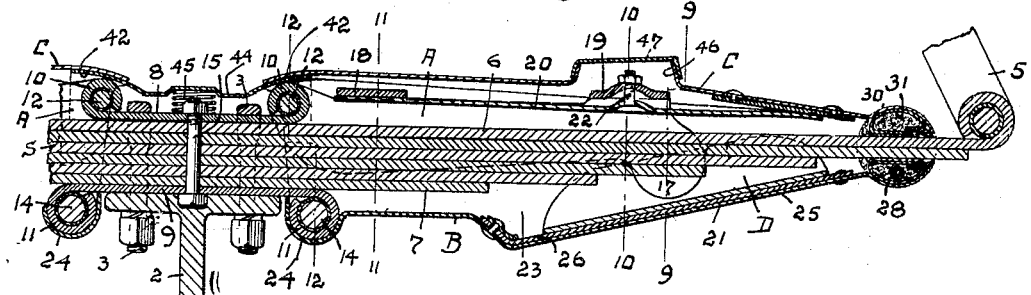
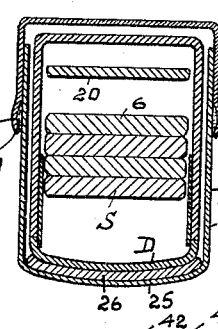
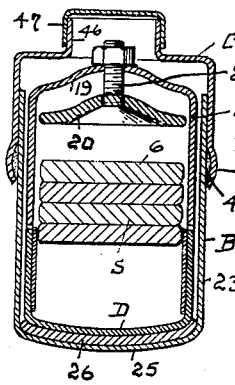
INVENTOR
GEORGE W. CRABTREE
BY
Fisher, Moser & Moore
ATTORNEY

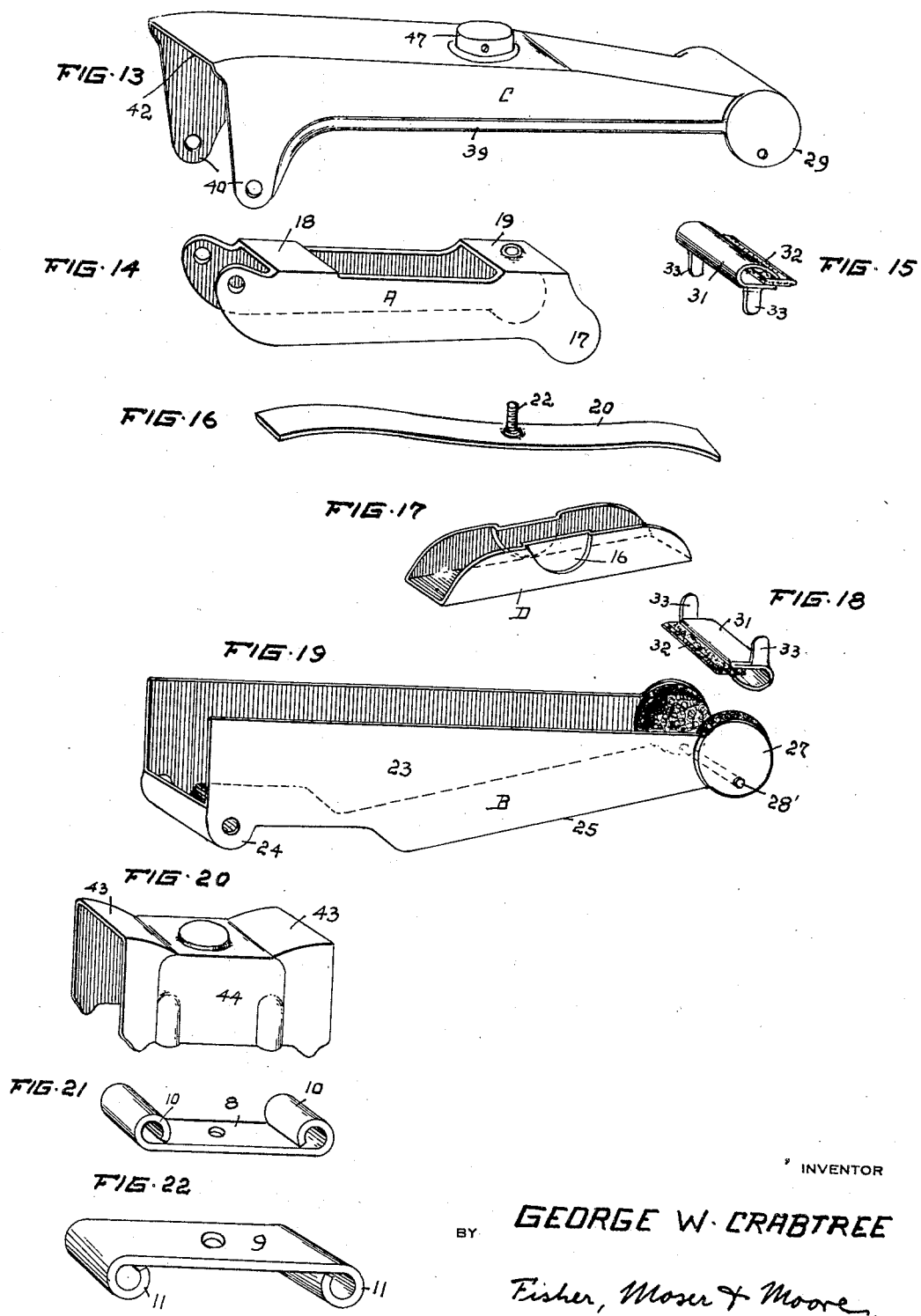

Patented May 31, 1932

1,860,658

UNITED STATES PATENT OFFICE

GEORGE W. CRABTREE, OF CLEVELAND HEIGHTS, OHIO

VEHICLE SPRING

Application filed December 21, 1929. Serial No. 415,647.

The present invention relates to vehicle springs, and an improved means for controlling the same, the object in general being to provide a device to enclose and house the vehicle spring as well as to control the yielding movements thereof. A further object is to provide a rigid enclosure or housing for the vehicle spring and to pivotally mount and movably connect the same so that it may readily follow the movement of the vehicle spring. Another object is to provide means within the spring enclosure or housing to check or retard the movement of the spring when under compression and also in its reflex action under rebound of the vehicle body. A still further object is to produce with said retarding and checking means a greater degree of check in the movements of the spring in one direction than in the opposite direction. Other objects are also embodied in the structural details of the device, all as hereinafter more specifically set forth.

In the accompanying drawings, Fig. 1 is a side view of a portion of a vehicle frame supported upon an axle by a suspension spring, including my improved device for enclosing and controlling the spring. Fig. 2 is a top view and horizontal section of the part shown in Fig. 1 on line 2—2 thereof. Fig. 3 is a bottom view of the axle and spring controlling parts connected therewith. Fig. 4 is an enlarged cross section and end view of the spring and its associated parts taken on line 4—4 of Fig. 1. Fig. 5 is a sectional view of the spring and the jointed connection on line 5—5 of Fig. 6, and Fig. 6 is a section view of the same parts on line 6—6 of Fig. 5. Fig. 7 is a side elevation corresponding to Fig. 1, but showing the outer members of the controlling device is section.

Fig. 8 is an enlarged longitudinal section of the vehicle spring and one set of control members therefor. Figs. 9, 10, 11, and 12, are cross sectional views, on a still larger scale, of the parts shown in Fig. 8, taken on lines 9—9, 10—10, 11—11, and 12—12, respectively. Fig. 13 is a perspective view of the top section or cover member of the controlling device. Fig. 14 is a perspective view of the main controlling member or lever. Fig. 15 is a perspective view of one of the spring packing and bearing members. Fig. 16 is a perspective view of the tension spring. Fig. 17 is a perspective view of the friction shoe. Fig. 18 is a perspective view of the second packing and bearing member. Fig. 19 is a perspective view of the lower section or bottom member. Fig. 20 is a perspective view of the cap or saddle. Figs. 21 and 22, are perspective views of the top and bottom anchor plates.

The invention is applicable to different forms of laminated leaf springs, and as an exemplification, I show the same applied to a semi-elliptic leaf spring S which is affixed at its middle to an axle 2 by clips or clevises 3 and shackled at its ends to a chassis frame 4 by pivotal connections 5 as customarily. Such vehicle springs are usually cambered or arched, and in use or under a given load the spring is flattened out more or less or substantially straight. Whether arched or straight, the flexure of the spring, either upwardly or downwardly produces relative longitudinal movement between the spring leaves or superposed laminations, and the flexible ends or one end of the spring also moves nearer or farther away from the axle. Such springs also embody a plurality of superposed leaves of graduated length, and when the spring is flexed the fulcrum point or center of the arc movement of each leaf is in the plane of the same leaf and relatively near the point where rigidly united to axle 2 by the clevises 3. The greatest relative movement between any two members of the spring is between the top and bottom leaves, 6 and 7, respectively, which are separated in the greatest degree or lie farthest apart, one above the other. A still greater relative movement may be obtained between two additional members A and B, respectively, by pivotally connecting these members to the axle at still greater distances apart than the leaves themselves, preferably above and below the plane of the upper and lower leaves of the spring. The increased movement between these members A and B, respectively, is utilized to control the action of the vehicle spring, and is effected by maintaining frictional engagement between the controlling members A and B, and connecting the same with the flexible outer ends of the leaves, preferably the longest leaf 6 or two or more of the longer leaves. The controlling members A and B are also particularly constructed and associated with a cover member C to enclose the vehicle spring for substantially its entire length, whereby the assembly of parts may be used to confine a suitable lubricant, and to serve as a dust and dirt protector for the spring.

As constructed, the device may be readily attached to a laminated vehicle spring S by adding a pair of plates 8 and 9, respectively, to the spring, said plates having curled ends or round eyes 10 and 11, respectively, adapted to receive a set of bushed pivot bolts 12 and 14, respectively. These plates are secured on opposite sides of the spring, that is, at its top and bottom, by a single rivet or bolt 15, although the clips or clevises 3 which fasten the spring to axle 4 may be used alone to clamp the plates rigidly to the spring and the axle. As shown, bottom plate 9 is relatively longer than upper plate 8, and the eyes 11 thereby are spaced somewhat further apart than the eyes 10 on upper plate 8. Thus referring to one half of the structure the two pivot bolts 12 and 14 for one pair of controlling members A and B, respectively, are situated in different vertical planes, a preferred relationship to foster the best results, but not necessarily the only position in which the pivots may be placed. The more essential relationship is found in the placement of the two pivots or pivot bolts 12 and 14 in different horizontal planes, preferably above and below the springs and as widely separated as a given need may require, whereby the two controlling members may be shifted relatively to each other in substantial degree to control the flexing movements of the spring in both directions, that is, both upwardly and downwardly, assuming the spring to be in a normally compressed state under a given load. Thus, member A coacts with member B to retard or check the flexing movement of spring S in either direction by shifting a friction shoe D lengthwise over member B. This shoe is pivotally connected to member A which is pressed from sheet steel into a yoke shape of sufficient width to freely straddle spring S.

Shoe D is an inverted U-shaped member made of pressed steel, having vertical side walls formed with round pockets 16 adapted to seat the correspondingly rounded downwardly-extending ends 17 of the side walls of yoke member A. The opposite ends of yoke member A are perforated and projected upwardly at each side to overlap the eyes or loops 10 and to receive bolts 12, and two cross pieces or connecting portions 18 and 19 complete the top part of yoke member A and provide a separate seat and support therein for a flat spring 20 which functions to draw members A and B together and to press the friction shoe D constantly against the inclined bottom 21 of lower member B. A bolt and nut 22 serve to connect spring 20 adjustably with the cross piece 19 of yoke member A.

Concerning this second member B, it is also made of pressed sheet steel and of U-shape, having vertical side walls 23 adapted to embrace spring S and also member A. Thus one end of member B is formed with a rounded depression 24 to receive the eye or loop 11 of bottom plate 9 and pivot bolt 14 extends through the side walls of this member and supports the same rotatably with a snug fit against the eye or loop 11. The bottom wall 21 of member B includes a straight upwardly-inclined portion 25 which is reenforced by a strip 26 of metal or other frictional material, against and over which shoe D is adapted to ride. Accordingly, the shoe is tilted to a correspondingly inclined plane, and when spring S flexes upwardly or downwardly the shoe is shifted longitudinally over the inclined bottom strip 26.

The inclined working relation of shoe D is desired to effect a different degree of retarding movement or check to the spring when flexed upwardly than when flexed downwardly, and the angle of inclination of bottom portion 25 and shoe D may be more or less than as shown, dependent upon the construction and flexibility of the spring and the load to be carried. Primarily, the device is designed to control the excess action of the spring occasioned by a sudden or violent rebound of the vehicle body, but it is also desirable to check or retard the compression movements of the spring within limits to permit the use of lighter and easier riding springs under a given load, thereby lessening the possibility of "hitting bottom" or having the frame strike the axle with such easier riding springs. To control a spring properly the compression check must be considerably less than the recoil check, and the ratio or proportion in degree of check may be determined by the angle of inclination adopted for the friction surfaces between the controlling members, and by pivoting said controlling members as hereinbefore described. Accordingly, on rebound of the spring the shoe D is forced up the incline 25 and on compression of the spring the shoe is drawn down the incline relatively to the pivots for controlling members A and B. Nut 22 permits adjustment of the device simply to vary the application of pressure of the friction shoe D on the friction strip 26, and the increase or decrease in the retarding effect does not alter the above mentioned ratio or proportion in degree of check obtained by incline 25. Preferably, the friction strip and the shoe are curved transversely to stiffen the structure, increase the frictional area and to center the pressure.

Now, referring to the connections for controlling members A and B with the flexible outer end of spring 5, a preferred connection is one which will permit relative movement between the parts and effective sealing results where the parts are joined together. Thus, the outer end of the side walls of channeled member B are formed with circular offsets or enlargements 27, and the outer end of the inclined bottom wall 21 is formed with a round segmental depression 28 conforming in diameter to said circular offsets. A tubular bushing and bolt 28' extends transversely of depression 28 to fasten the offset ends of members B and C together. These offsets are fitted within a pair of circular side pockets 29 formed within the outer end of the channeled cover C. The outer end of this cover member is also formed with a circular segmental depression 30 conforming in diameter and complementary to depression 28 in member B, and in assemblying the parts these depressions nest a pair of metal bearing and packing members 31—31 made of spring stock bent in part on curved lines to fit the round walls of the depression and also bent or folded in part on straight lines to bear flat against the flat surfaces of one or more leaves of spring S. To further promote a fluid-tight union and to exclude dirt at the jointed connection with spring S, each spring member 31 is constructed to clamp and hold a flat strip 32 of felt or other compressible material between its curved and flat portions, the strip being projected outwardly and compressed between the spring leaf and the straight end edges 33 of the circular walls forming the depressions 28 and 30, respectively, see Fig. 6.

The inner sides of the circular offset portions 27 of channeled member B are also faced with felt or some other compressible or absorbent material, and the spring members 31 are preferably as wide as the spring and provided with short tongues 33 adapted to hook over the side edges of the spring leaves and prevent lateral displacement of the bearing members relatively to the spring. The spring members 31 serve several useful purposes, that is, they provide slidable bearings for members B and C, and also a rotatable or pivotal connection for these members jointly with spring S. They also provide fluid-tight and dust-proof packings where slidably engaged with the spring. In addition, the inherent tension in the spring members 31 and their rounded formation contribute to interlock the assembled parts together and to eliminate looseness and rattle between the relatively movable parts. Members 31 also brace and strengthen the union between members B and C.

Cover member C is pressed from sheet metal into a channeled form, and a channeled bead 39 extends along the border edge of each side wall or flange within which a strip 40 of packing material may be confined to press against the flat side walls of bottom member B. Perforated arms or ears 41 are also provided at the inner end of cover member C to permit a pivotal connection to be made with the lower cross bolt 14 carried by bottom plate 9. Consequently, members B and C are free to swing or pivot jointly as a single rigid member from bolt 14 when spring C flexes in either direction, the movement of the spring being imparted to these rigid members by and through the rotatable and slidable bearing members 31.

To enclose the assembly of parts completely so that a lubricant may be stored and used in the chamber surrounding the spring, the upper inner end 42 of cover member C is curved on a radius having the axis of the pivot bolt 14 as its center, and this curved portion 42 overlaps and rides upon a correspondingly curved top wall 43 of a cap member or saddle 44 which is seated in a removable position upon axle 2 to cover the base or middle part of spring S and the plates 8 and 9 where secured to the axle by the clips or clevises 3. A coiled compression spring 45, seated upon top plate 8, presses upwardly against the saddle or cap member 44, thereby holding the curved top portion 43 in constant engagement with the curved overlapping part 42, thereby also avoiding looseness and rattle between these parts. In applying the invention to a semi-elliptic spring, only a single cap or saddle member 44 is provided for two sets of controlling members, the working parts on opposite sides of the axle being in duplicate to control both ends of the spring. However, where other forms of vehicle springs are used, the device would be modified to fit the same, without any material change in or departure from the invention itself.

The bowing or flexing of spring S is usually slight but is amply accommodated by the relatively deep chamber within the two channeled sections or members B and C, so that in the normal workings of the spring, the spring will not contact with any part of the device except where rotatably and slidably connected therewith at or near the suspensory shackle connections. In case the spring is subjected to excessive stress whereby it would deflect to or about its elastic limits, the curved spring will come into contact with the bottom (or top) of the rigid enclosure and thereby prevent extreme distortion, separation of the leaves, and breakage of the spring. To permit the introduction of a lubricant and inspection of the interior, and to facilitate tightening or adjustment at bolt and nut 22, the cover section C is provided with a flanged opening 46, and a suitable cap or cover 47 of any kind or type may be used to close this opening. Leakage of the lubricant at the cap or saddle 44 and the joints thereat may be prevented by lining the cap and spring with felt or any suitable packing.

What I claim, is:

1. A vehicle spring, and a pair of frictionally engaged members supported to swing in different arcs, and means coupling the end of one of said members slidably to the freely movable end of the spring.

2. A vehicle spring, and a pair of frictionally engaged members supported on independent pivots spaced a substantial distance apart to swing in different arcs and effect relative longitudinal movements between said members where frictionally engaged and means to slidably couple one of said members to the free end of the spring.

3. A controlling device for a laminated vehicle spring, comprising a pair of rigid members frictionally coupled together and supported to swing in different arcs, and one of said members being movably coupled to a flexible portion of the spring to oscillate said members when the spring is flexed in either direction.

4. A controlling device for a laminated vehicle spring, comprising a pair of rigid members having separate supporting pivots spaced apart to permit said members to swing in different arcs, being frictionally coupled together, and one of said members being movably coupled to a flexible portion of the spring to oscillate said members on their respective pivots when the spring is flexed in either direction.

5. A controlling device for laminated vehicle spring, comprising a pair of relatively-movable controlling members supported at corresponding ends in planes above and below the spring and connected at their opposite ends with a free flexing portion of the spring, including means for frictionally retarding the relative movement between said controlling members.

6. A controlling device for laminated vehicle springs, comprising a pair of controlling members having hinge pivots at one end located in planes above and below the spring and connected at their opposite ends with a free flexing portion of the spring, including means for frictionally retarding the relative movement between the said controlling members.

7. A controlling device for laminated vehicle spring, comprising a pair of controlling members having their corresponding ends connected to supports above and below the plane of the spring, one of said members being coupled to said spring to move with the spring upon flexure of the spring, and means inclined relatively to the plane of the spring for frictionally retarding the movements of said parts.

8. A controlling device for laminated vehicle springs, comprising a pair of controlling members pivoted at corresponding ends above and below the plane of the spring, one of said members being coupled to said spring to impart movement thereto upon flexure of the spring, and means inclined relatively to the plane of the spring for frictionally retarding the movements of said parts.

9. A controlling device for laminated vehicle springs, comprising a pair of controlling members supported to swing in different planes, a frictional shoe connected with one member and bearing against the other member, and means for coupling one of said members movably with the flexible end of the spring.

10. A controlling device for laminated vehicle springs, comprising a pair of members hinged in different planes, a friction shoe pivotally connected with one member and bearing against the other member, and means for coupling one of said members slidably and pivotally with the flexible end of the spring.

11. A controlling device for laminated vehicle springs, comprising two rigid members yieldably supported in spaced relations at corresponding ends thereof, a friction shoe interposed between said members, means for placing said members and shoe under tension, and means for coupling the opposite end of one of said members movably with a freely flexible portion of the spring.

12. A controlling device for laminated vehicle springs, comprising two rigid members pivotally supported in different planes, a friction shoe interposed between said members, means for placing said parts under tension, and means for coupling one of said members movably with a freely flexible portion of the spring.

13. A laminated vehicle spring, a pair of channeled members enclosing said spring and coupled movably to the free end of the spring, a controlling member hinged at the fixed end of said spring, and friction-producing means interposed between said controlling member and one of said channeled members.

14. A controlling device for a laminated vehicle spring, comprising a pair of channel members constructed to house the spring, a controlling member supported to swing in an arc and frictionally coupled to one of said channel members, and one of said channel members being movably coupled to a flexible portion of the spring to oscillate said member when the spring is fixed in either direction.

15. A controlling device for laminated vehicle springs, comprising a hinged housing for the spring, a controlling member hinged independently in respect to said housing, said housing being coupled to a free flexing portion of the spring, and means for frictionally retarding the relative movement between said housing and controlling member.

16. A controlling device for laminated vehicle springs, comprising a controlling member and a spring housing pivoted at corresponding ends above and below the plane of the spring, said housing being coupled to move with said spring upon flexure of the spring, and means inclined relatively to the plane of the spring for frictionally retarding the movements of said parts.

17. A controlling device for laminated vehicle springs, comprising a sectional housing for the spring coupled to move with the spring, a friction shoe engaging said housing, and a controlling member for shifting said shoe during the movements of said housing and spring.

18. A controlling device for laminated vehicle springs, comprising a spring housing and a controlling member having supporting pivots located in different planes, a friction shoe interposed between said housing and controlling member, means for placing said parts under tension, and means for coupling one end of said housing movably with a freely flexible portion of the spring.

19. A vehicle spring, a pair of complementary housing members for the spring, one of said members being coupled slidably and pivotally at one end to the spring, and pivotally supported at its opposite end on a fixed part of the vehicle.

20. A vehicle spring, in combination with a rigid housing for the spring, comprising a saddle member adapted to be affixed to the middle of the spring, and a pair of separable enclosure members pivotally connected to said saddle member and pivotally and slidably coupled to a flexible portion of the spring.

In testimony whereof I affix my signature.

GEORGE W. CRABTREE.